(12) United States Patent
Wild

(10) Patent No.: US 7,784,220 B2
(45) Date of Patent: Aug. 31, 2010

(54) DOOR MODULE ASSEMBLY WITH INTEGRATED ACTUATOR HOLDER

(75) Inventor: Brian Wild, Ferndale, MI (US)

(73) Assignee: Hi-Lex Corporation, Troy, MI (US)

( * ) Notice: Subject to any disclaimer, the term of this patent is extended or adjusted under 35 U.S.C. 154(b) by 385 days.

(21) Appl. No.: 11/224,816

(22) Filed: Sep. 13, 2005

(65) Prior Publication Data

US 2007/0056220 A1   Mar. 15, 2007

(51) Int. Cl.
*E06B 3/00* (2006.01)
(52) U.S. Cl. .......................................... 49/503; 49/506
(58) Field of Classification Search .................. 49/502, 49/503, 506; 74/526–529, 502.4, 502.6
See application file for complete search history.

(56) References Cited

U.S. PATENT DOCUMENTS

| | | | | |
|---|---|---|---|---|
| 3,041,098 A * | 6/1962 | Johnson et al. | ................ | 292/78 |
| 3,122,796 A * | 3/1964 | Woolley | ........................ | 49/503 |
| 4,345,862 A * | 8/1982 | Blout et al. | .................. | 410/134 |
| 4,554,818 A * | 11/1985 | Kuehling | ................. | 72/409.01 |
| 4,850,636 A * | 7/1989 | McLaren et al. | ......... | 296/146.5 |
| 5,308,129 A * | 5/1994 | Hlavaty | ....................... | 292/216 |
| 5,429,410 A * | 7/1995 | Fleischer | ................. | 296/146.6 |
| 6,108,979 A * | 8/2000 | Saffran et al. | ................. | 49/503 |
| 6,148,564 A | 11/2000 | Dancasius | ....................... | 49/502 |
| 6,374,694 B1 * | 4/2002 | Chen | ........................ | 74/502.2 |
| 6,536,164 B1 | 3/2003 | Kirejczyk | ..................... | 49/502 |
| 6,571,515 B1 | 6/2003 | Samways et al. | ............... | 49/502 |
| 6,578,446 B2 * | 6/2003 | Staser et al. | ................... | 74/519 |
| 6,688,043 B1 | 2/2004 | Feder et al. | .................... | 49/352 |
| 2001/0022051 A1 * | 9/2001 | Fukumoto et al. | ............. | 49/503 |
| 2002/0005015 A1 * | 1/2002 | Spurr | ........................... | 49/502 |
| 2003/0093954 A1 * | 5/2003 | Willats et al. | .................. | 49/279 |
| 2003/0177796 A1 * | 9/2003 | Dimig | .......................... | 70/237 |
| 2004/0093799 A1 * | 5/2004 | Yoshikawa et al. | ............ | 49/192 |
| 2006/0000149 A1 * | 1/2006 | Radu et al. | ..................... | 49/502 |
| 2006/0037250 A1 * | 2/2006 | Staser | ......................... | 49/502 |
| 2007/0006536 A1 * | 1/2007 | Youngs et al. | ................ | 49/502 |
| 2007/0017159 A1 * | 1/2007 | Moore | .......................... | 49/502 |
| 2007/0107314 A1 * | 5/2007 | Ottino | .......................... | 49/502 |
| 2007/0220812 A1 * | 9/2007 | Valentage et al. | ............. | 49/502 |

* cited by examiner

*Primary Examiner*—Jerry Redman
(74) *Attorney, Agent, or Firm*—Young Basile Hanlon & MacFarlane, P.C.

(57) ABSTRACT

A motor vehicle door module assembly including a door module plate assembly mounting a bell crank having a first arm portion positioned to be engaged by an outside door handle and a second arm portion connected to a link arranged to trip the door latch. The door module assembly is integrally formed with a socket pivotally receiving the bell crank. The bell crank includes a pivot shaft portion sized to be journaled in the socket. The pivot shaft portion is configured to be inserted into the socket in a first angular position and, following insertion, the bell crank is rotated to rotate the pivot shaft portion in the socket to a second, operative angular position where the link may extend between the bell crank second arm portion and the latch and inadvertent withdrawal of the pivot shaft portion is precluded. The pivot shaft configuration allowing insertion into the socket comprises opposite flats on the shaft portion defining reduced diameter shaft portion sections and the modular plate assembly defines slots providing access to the socket and sized to pass the reduced diameter shaft portion sections to allow positioning of the pivot shaft portion in the socket.

10 Claims, 5 Drawing Sheets

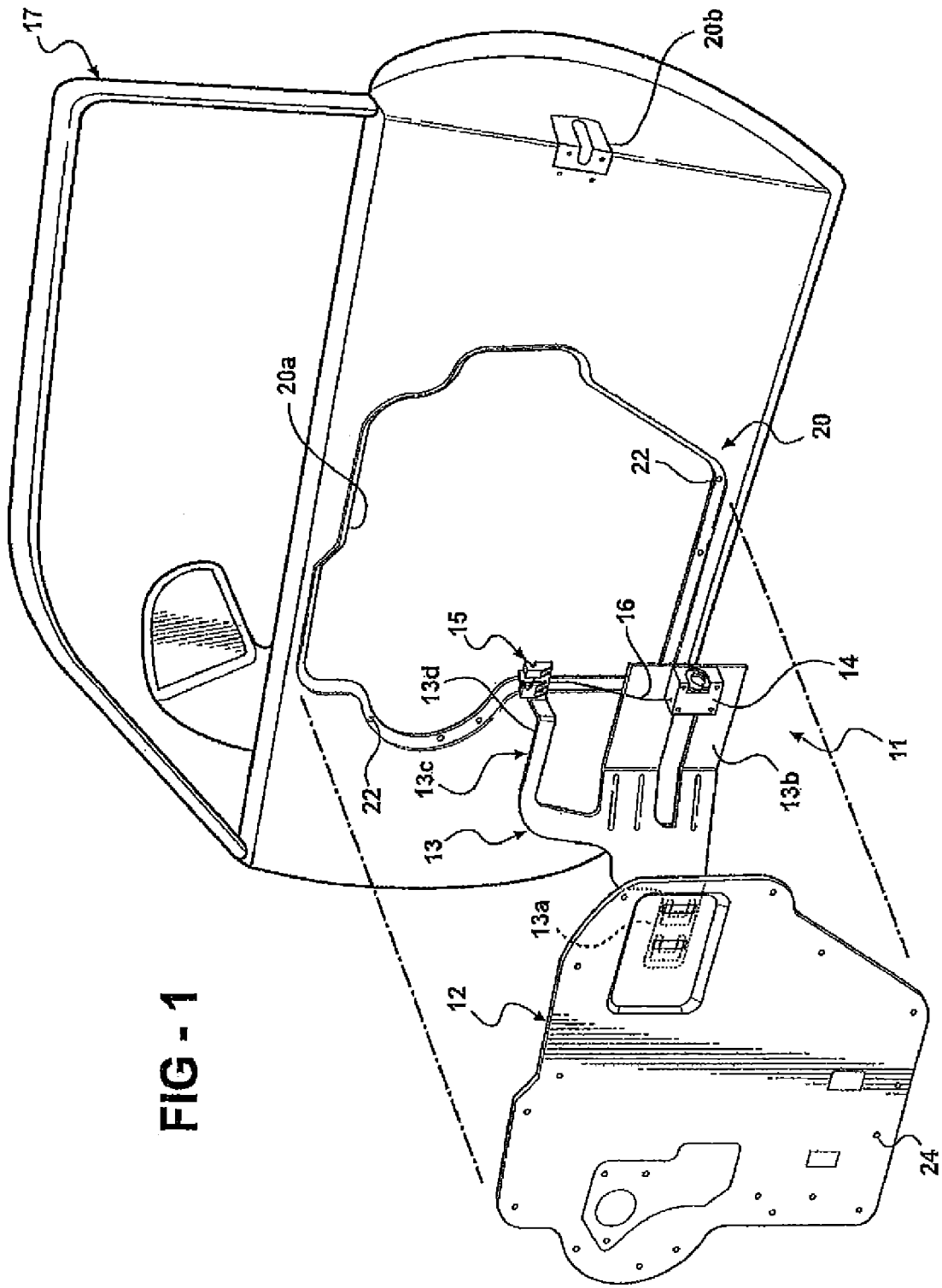

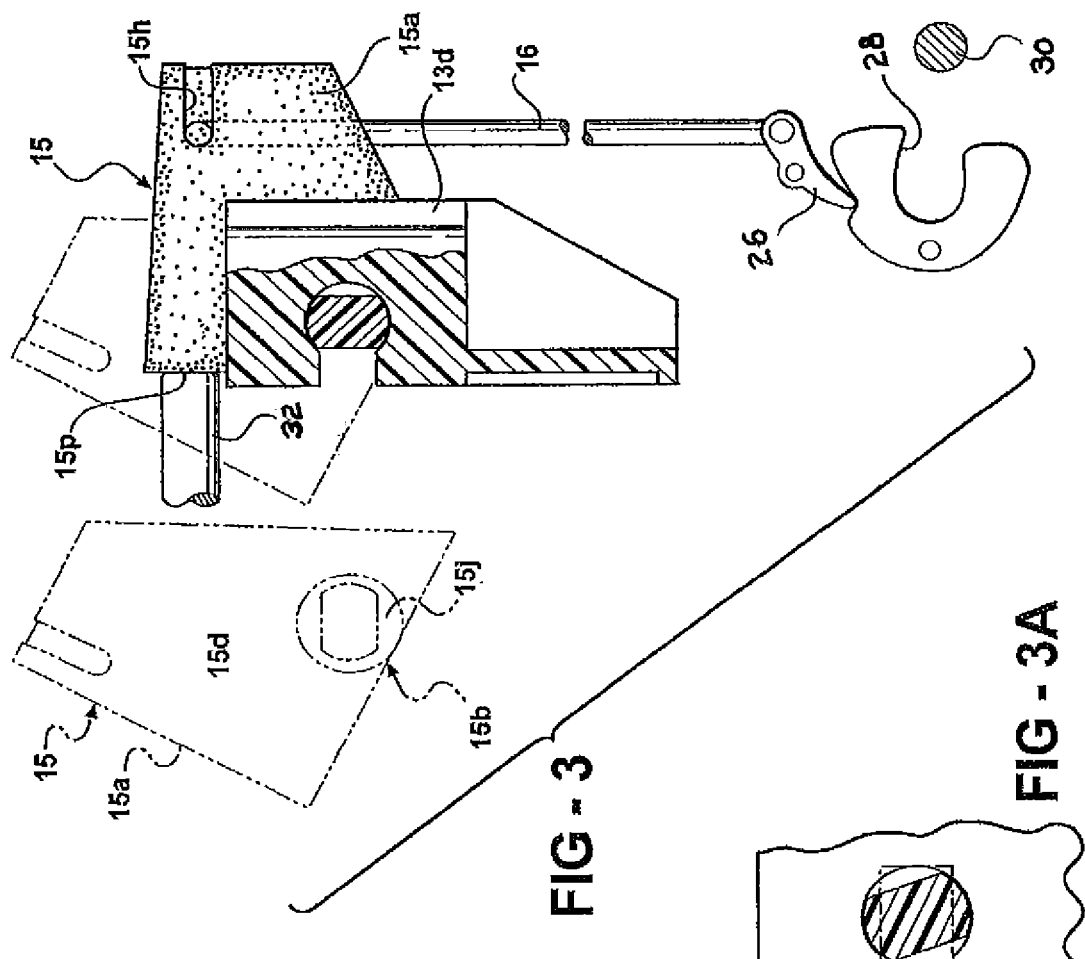
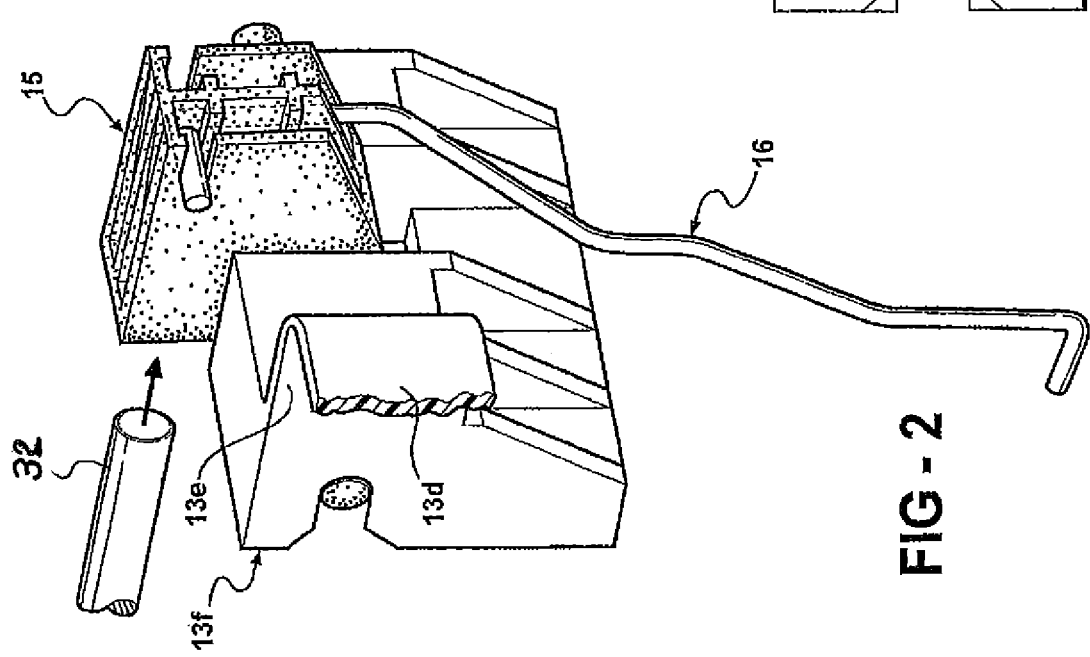
FIG - 3
FIG - 3A
FIG - 2

DOOR MODULE ASSEMBLY WITH INTEGRATED ACTUATOR HOLDER

BACKGROUND

This invention relates to motor vehicle door assemblies and more particularly to a door module for use in forming a motor vehicle door assembly.

In the assembly of a present day motor vehicle door the inner panel of the door is typically provided with an opening and a door module, typically from a supplier, is fastened in the opening by the OEM on the assembly line. The door module typically carries door accessory items such as the window regulator mechanism and may also carry the door latch and an actuator for actuating the latch in response to actuation of the outside door handle. The installation of the actuator on the door module is expensive both in terms of labor and materials.

SUMMARY

This invention is directed to the provision of an improved motor vehicle door module assembly.

More particularly, this invention is directed to a motor vehicle door module assembly wherein the provision of an actuator to actuate the door latch in response to actuation of the outside door handle is simplified from both a labor and a materials standpoint.

This invention concerns a door module assembly of the type including a module plate assembly mounting an actuator positioned to be engaged by an outside door handle and connected to a link arranged to trip the door latch in response to movement of the actuator.

According to an important feature of the invention, the door module assembly is integrally formed with a holder structure mounting the actuator for movement between latched and unlatched positions. This arrangement simplifies the installation of the actuator and minimizes the materials required to provide the actuator.

According to a further feature of the invention, the holder structure comprises a socket; the actuator comprises a bell crank having a first arm portion positioned to be engaged by the outside door handle, a second arm portion connected to the link, and a pivot shaft portion sized to be journalled in the socket; the pivot shaft portion and socket are coactingly configured to allow the pivot shaft portion to be inserted into the socket with the pivot shaft portion in a first angular position relative to the socket; and following insertion the bell crank is rotated to rotate the pivot shaft portion in the socket to a second, operative angular position relative to the socket where the link may extend between the bell crank second arm portion and the latch and withdrawal of the shaft portion is precluded. This arrangement greatly simplifies the installation of the bell crank on the module assembly.

According to a further feature of the invention, the pivot shaft portion has a circular cross-sectional configuration; the socket has a circular cross-sectional configuration sized to pivotally mount the shaft portion; the pivot shaft portion configuration allowing insertion into the socket comprises opposite flats on the shaft portion defining reduced diameter shaft portion sections; and the module plate assembly defines slots providing access to the socket and sized to pass the reduced diameter shaft portion sections to allow positioning of the pivot shaft portion in the socket. This specific configuration further simplifies the installation of the bell crank on the door module assembly.

The invention also provides an improved method of fabricating a motor vehicle door module assembly of the type including a module plate assembly, a door latch, and an actuator positioned to be engaged by an outside door handle and connected to a link arranged to trip the latch in response to movement of the actuator.

The invention methodology comprises the steps of fabricating the module plate assembly; securing the latch to the module plate assembly; mounting the actuator on the module plate assembly with the actuator in a first angular position; moving the actuator to a second angular position; and attaching the link to the actuator and to the latch with the actuator in the second angular position. This methodology provides a ready and expedient way of mounting the actuator on the module plate assembly and installing the link between the actuator and the door latch.

According to a further feature of the invention methodology, the actuator comprises a bell crank having a first arm portion positioned to be engaged by the outside door handle assembly and a second arm portion connected to the link; the bell crank is pivotally mounted on the module plate assembly with the bell crank in the first angular position; the bell crank is thereafter pivoted to the second angular position; and the link is attached to the second arm portion of the bell crank with the bell crank in the second angular position. This specific methodology further facilitates the mounting of the actuator on the module plate assembly and the installation of the link between the actuator and the door latch.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a somewhat schematic exploded view of a motor vehicle door structure including a module plate;

FIG. 2 is a fragmentary perspective of the structure within the circle 2 of FIG. 1;

FIG. 3 is a somewhat schematic view showing the installation of an actuator on the module plate;

FIG. 3a shows further details of the actuator installation;

DETAILED DESCRIPTION OF THE PREFERRED EMBODIMENT

Figure 4:
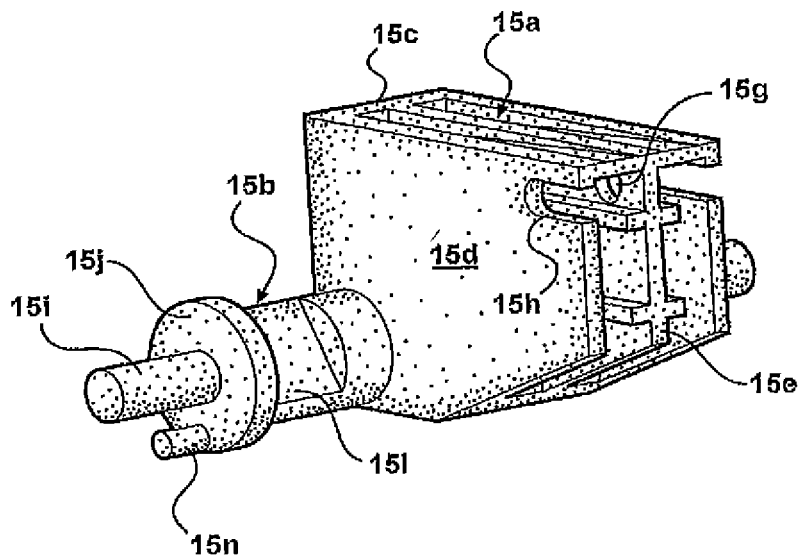
FIGS. 4, 5 and 6 are detail views showing the construction of the actuator.
Figure 5:
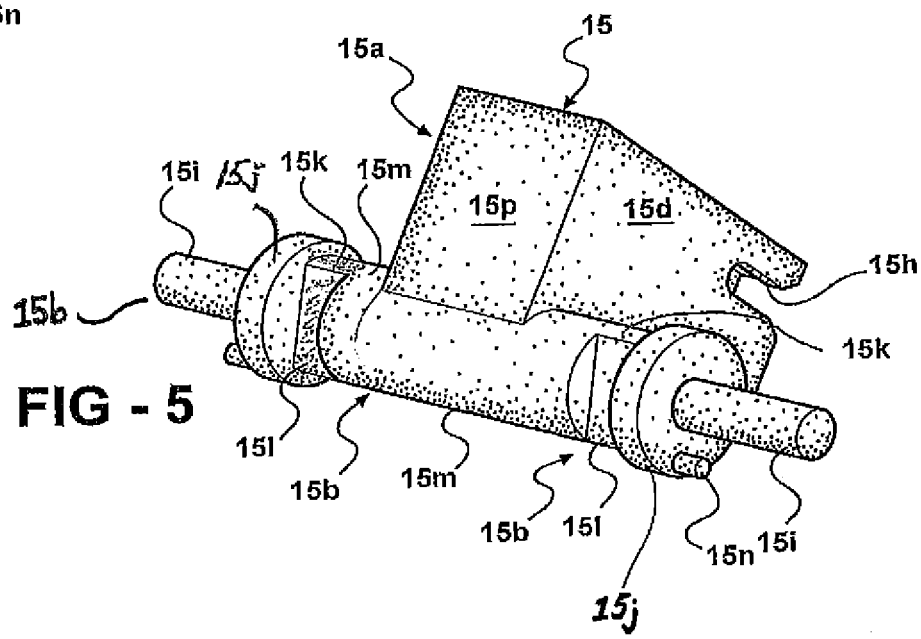

The motor vehicle door seen schematically and fragmentarily in FIG. 1 includes a door structure 10 and a door module assembly 11 including a module plate assembly, comprising a module plate 12 and a presenter plate 13, a latch 14, an actuator 15, and a link 16. It will be understood that the door module assembly would further typically also include a window regulator mechanism (not shown) controlling the movement of the window glass of the door structure.

Door structure 10 includes a frame portion 17 defining a window opening 18 and an inner panel 20 defining a module opening 20a and a plurality of apertures 22 in spaced surrounding relation to the opening 20a. Door structure 10 is typically formed as a metal fabrication.

Module plate 12 is typically formed of a plastics material in a molding operation, has a size and shape generally conforming to the size and shape of the door inner panel opening 20a, and is secured to the door inner panel within the dash lines seen in FIG. 1 utilizing suitable fasteners passing through apertures 24 in the module plate and inner door panel apertures 22.

Presenter plate 13 is also typically formed of a plastics material in a molding operation and includes a tongue portion 13a including a pair of fingers 13u positioned in cutouts 13v and arranged for coaction with bands 12a on module plate 12 to snappingly secure the presenter plate to the module plate with the fingers 13u respectively received beneath the bands 12a and a nub 13w on one of the fingers 13v coacting with the respective band 12a to preclude inadvertent withdrawal of the presenter plate from the module plate. Thus installed, it will be seen that the presenter plate extends rearwardly, relative to the door structure, from module plate 12.

Presenter plate 13 further includes a lower latch arm 13b mounting the door latch 14 (which is shown only schematically) and an upper actuator arm 13c for mounting the actuator 15 connected to link 16 for controlling the operation of the latch. Actuator arm portion 13c includes a main body portion 13d, an offset portion 13e, and a holder structure 13f defining a socket structure for pivotally mounting the actuator 15.

Actuator 15 includes a main body portion 15a and shaft portions 15b extending from opposite side faces of the main body portion. The main body portion 15a has a hollowed configuration and includes a top wall 15c, sidewalls 15d, and a central partition 15e including rub rails 15f and defining a bore 15g. A slot 15h is formed in each side wall 15d in alignment with bore 15g.

Each shaft portion 15b includes a lateral extension 15i defining a spring guide portion, a collar portion 15j, a partial journal portion 15k deliminated by opposite flats 15l, and a full journal portion 15m.

Figure 7:
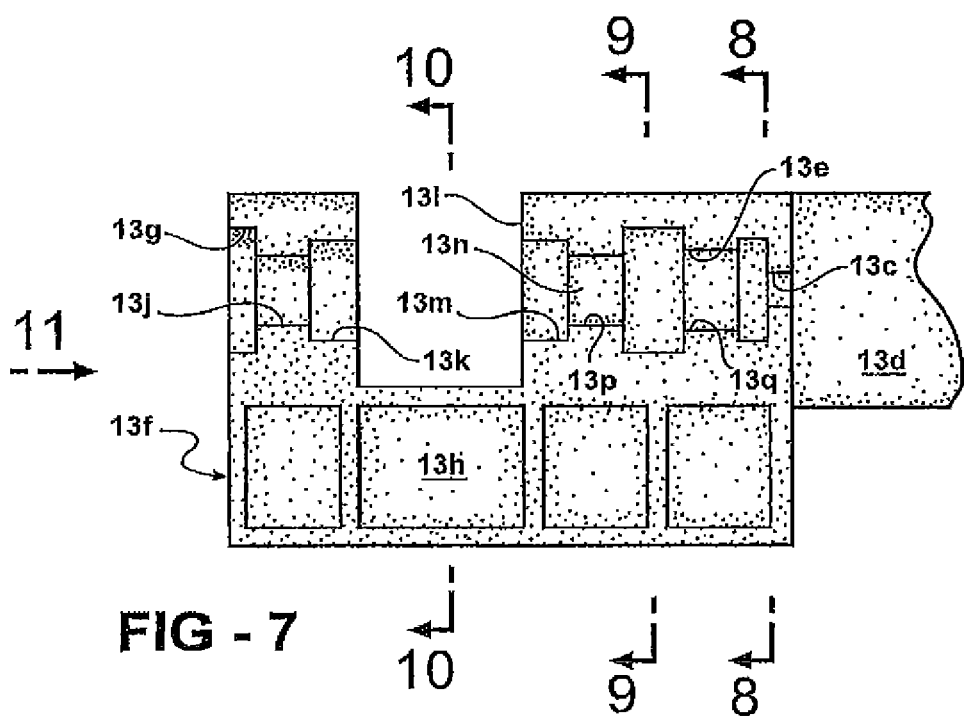
FIG. 7 is a view showing a socket structure arranged to pivotally mount the actuator.
Figure 8:
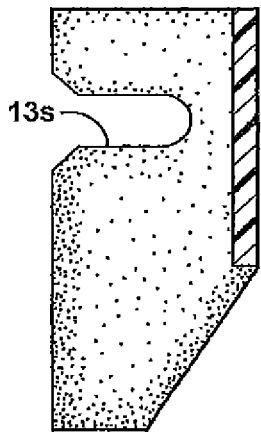
FIGS. 8, 9 and 10 are cross-sectional views taken respectively on lines 8-8, 9-9 and 10-10 of FIG. 7.
Figure 9:
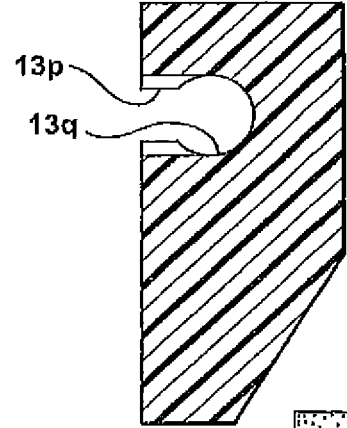
Figure 10:
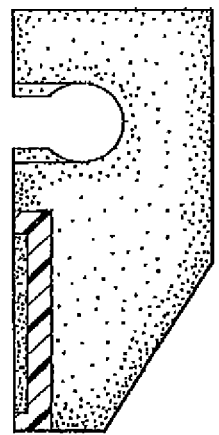
Figure 11:
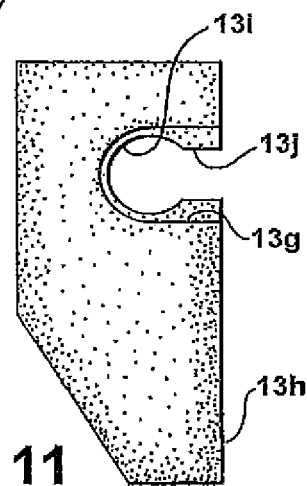
FIG. 11 is a view looking at direction of the arrow 11 in FIG. 7.
Figure 12:
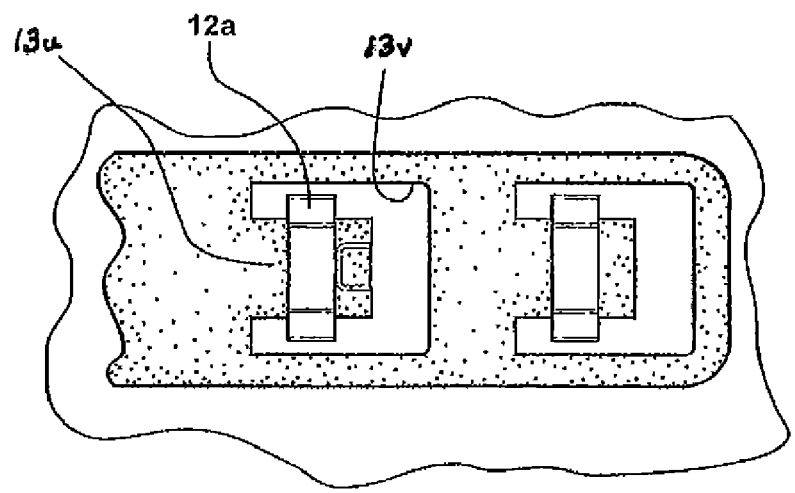
FIGS. 12 and 13 are detail views showing the connection of a presenter plate to a module plate.
Figure 13:
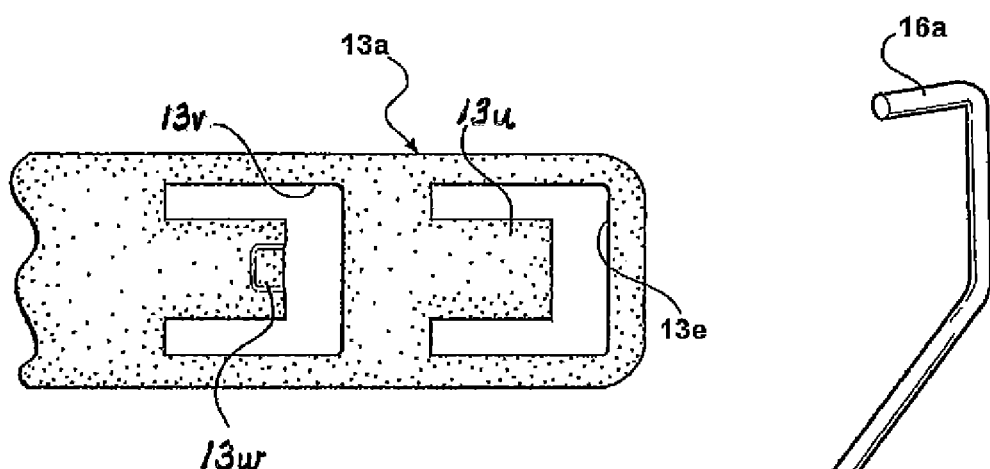
Figure 14:
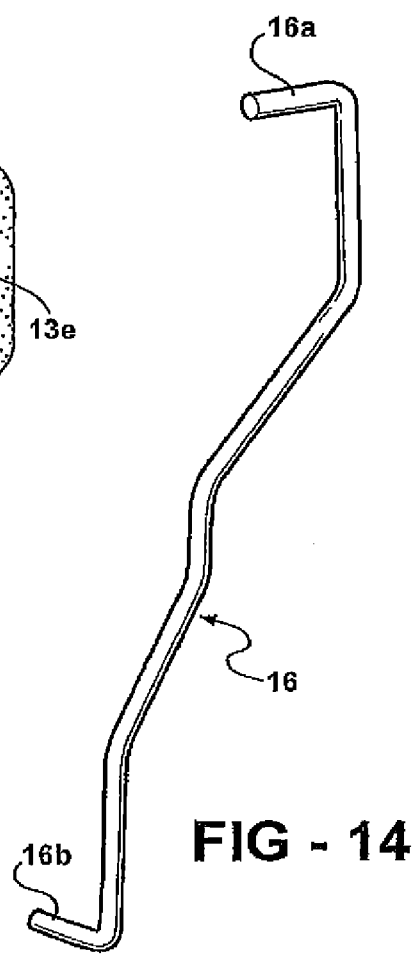
FIG. 14 is a perspective view of a link employed in the door module assembly.

Holder structure 13f is sized and configured to define a socket structure to receive and pivotally mount actuator 15. Specifically, progressing from left to right in FIG. 7, socket structure 13f defines a "U" shaped surface 13g opening in the rear face 13h of the holder structure and sized to receive a collar portion 15j of the actuator shaft; a journal surface 13i sized to journal a partial journal portion 15k of the actuator shaft portion and accessible from the rear face 13h of the holder structure via a slot 13j sized to pass the flats 15l of the partial journal structure 15k; a "U" shaped journal surface 13k sized to journal full journal actuator shaft portion 15m; a central cutout 13l sized to accommodate the actuator main body portion 15a; a "U" shaped journal portion 13m sized to journal a full journal portion 15m of the actuator shaft; a journal surface 13n sized to journal a flatted actuator partial journal portion 15k and accessible from the rear face 13h of the holder structure via a slot 13p sized to pass the flats 15l of the flatted partial journal portion 15k; a "U" shaped surface 13q opening in the rear face 13h of the holder structure and sized to receive an actuator shaft collar portion 15j; a spring cavity 13r; and a slot 13s opening in the rear face of the holder structure and sized to journal an actuator spring shaft portion 15i.

To assemble the door module assembly, the presenter plate 13 is suitably secured to the module plate 12 utilizing the fingers 13b coacting with the bars 12a; the latch 14 is suitably secured to the latch arm 13b of the presenter plate; the actuator 15 is pivotally mounted on the holder structure 13f; and the link 16 is interconnected between the actuator and the latch.

The installation of the actuator on the holder structure is best seen in FIGS. 3 and 3a wherein the actuator is seen in dash lines in a pre-installation position, in chain lines in an initially installed position, and in solid lines in an operative position in which the link is installed between the actuator and the latch.

To install the actuator in the holder structure the actuator is positioned with the flats on the shaft portions 15k aligned with the slots 13j in the holder structure whereafter the actuator is moved forwardly to pass the flats 15l through the slots 13j to position the collars 15j in the surfaces 13g and 13q, position the flatted partial journals 15k proximate the journals 13i and 13n, position the full journals 15m in the journal surfaces 13k and 13m, journal the end of the right hand spring shaft portion 15i in the slot 13s, and position the spring 18 in the spring cavity 13r with one end of the spring engaging a spring anchor nub 15n on a collar 15j and the other end of the spring suitably engaging a surface of the cavity 13r whereby the spring resists pivotal movement of the actuator in the holder structure.

Following this initial installation of the actuator, the actuator is rotated or pivoted in a clockwise direction as viewed in FIG. 3 to the solid line position of FIG. 3 whereupon the link 16 is connected between the actuator and the latch. Specifically, the actuator crank 16a of the link is passed through one notch 15h, through central bore 15g, and positioned with its free end in the other notch 15h, whereafter the link is rotated downwardly as viewed in FIG. 3 and the latch crank 16b of the link is suitably connected to a pawl 26 serving as a detent for latch member 28 so that in known manner and schematically, downward movement of the link as viewed in FIG. 3 has the effect of disengaging the pawl 26 and tripping the latch to allow the door to be opened. It will be understood that rotation of the actuator from the installation position to the solid line, operative position has the effect of rotating the flats 15l out of alignment with the slots 13j, whereby to preclude inadvertent separation of the actuator from the presenter plate.

Following the assembly of the door module assembly, the door module assembly is assembled to the door structure with the module plate 12 essentially filling the opening 20a and the presenter plate 13, together with the actuator 15, link 16 and latch 14, positioned between the inner and outer panels of the door, the latch positioned in the door latch opening 20b where it may coact in known manner with a striker 30 carried on the door jamb, and the outboard face 15p of the actuator main body positioned in the path of movement of an outside door handle button 32, whereby inward movement of the outside door handle button 32 in response to operator actuation moves the actuator from the solid line position of FIG. 3 in a clockwise direction to move the link 16 downwardly and trip the latch to allow the door to be opened.

Figure 6:
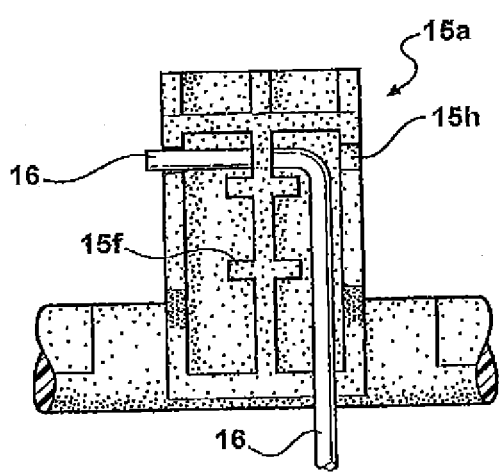

The actuator of the invention will be seen to not be handed but rather to be suitable for use in either a left hand door installation or a right hand door installation with a given spring shaft portion 15i in one case accommodating the coil spring and in the other case projecting outwardly from the holder structure and with the link 16 on the one hand positioned in the right hand groove as seen in FIG. 6 defined between the central partition 15e and a side wall 15d with the actuator crank portion 16a extending to the left and with the link on the other hand positioned between the central partition and the other wall 15*d* with the actuator crank portion 16*a* extending to the right as viewed in FIG. 6.

Although actuator 15 is seen as comprising a generally monolithic main body portion, it will be understood that the actuator functions in the disclosed environment in the manner of a bell crank with the link 16 connected to a first arm portion of the bell crank and the outside door handle member 32 engaging a second arm portion of the bell crank.

The door module assembly of the invention simplifies the provision of the door module assembly from both a materials and labor standpoint. Specifically, by forming the holder or socket structure for the actuator as an integral portion of the module plate assembly, there is no need to provide a separate bracket or other member to pivotally mount the actuator and there is no need to install the bracket on the module plate as a separate labor operation. The described arrangement whereby the actuator is simply inserted into the socket structure and thereafter rotated to its operative position both simplifies the assembly of the actuator to the module plate assembly and further determines the precise position of the actuator for connection of the link between the actuator and the latch.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. For use with a motor vehicle door structure including spaced inner and outer panels, an outside door handle positioned on the outer panel, a module opening in the inner panel, and a latch opening for receipt of a latch for coaction with a striker on the door jamb to latch and unlatch the door, a motor vehicle door module assembly including a door module plate assembly for positioning in the module opening and mounting an actuator positioned with the door module plate assembly in the module opening to be engaged by the outside door handle and connected to a link arranged to trip the door latch in response to movement of the actuator, wherein:

a holder structure integral with the door module and defining a socket having a pivot axis the actuator being pivotally mounted in the socket for movement between latched and unlatched positions;

said socket including spaced left and right journal portions centered on the socket pivot axis a slot in the holder structure to provide access to said journal portions;

the actuator including a bell crank having a main body portion defining a first arm portion positioned to be engaged by the outside door handle and a second arm portion connectable to the link, and a pivot shaft portion including left and right cylindrical journal portions extending from opposite sides of the main body portion sized to be journalled in the socket and defining a pivot shaft axis;

the pivot shaft journal portions each including a flatted section sized to be aligned with and pass through a respective slot with the pivot shaft in a first angular position so as to position the left and right pivot shaft journal portions in the left and right socket journal portions respectively and so as to thereafter allow rotation of the pivot shaft in the socket to a second, operative angular position where the link may extend between the bell crank second arm portion and the latch and where the flatted sections are misaligned with the slots to preclude withdrawal of the pivot shaft from the socket; and the first arm portion of the actuator operative, with the door module plate assembly positioned in the module opening, to be engaged by the outside door handle in response to inward movement of the outside door handle to rotate the actuator in the socket and trip the door latch.

2. For use with a motor vehicle door structure including spaced inner and outer panels, an outside door handle positioned on the outer panel, a module opening in the inner panel, and a latch opening for receipt of a latch for coaction with a striker on the door jamb to latch and unlatch the door; a motor vehicle door module assembly including a door module plate assembly for positioning in the module opening and mounting a bell crank having a first arm portion positioned to be engaged by the outside door handle and a second arm portion connected to a link arranged to trip the door latch, wherein:

a holder structure integral with the door module assembly and defining a socket pivot axis the bell crank being pivotally mounted iii the socket for movement between latched and unlatched positions;

the socket including spaced left and right journal portions centered on the socket pivot axis and each accessible by a slot in the holder structure;

the bell crank including a main body portion defining the first and second arm portions and a pivot shaft including left and right cylindrical journal portions extending from opposite sides of the main body portion sized to be journalled in the socket and defining a pivot shaft axis;

the pivot shaft journal portions each include a flatted section sized to be aligned with and pass through a respective slot with the pivot shaft in a first angular position so as to position the left and right pivot shaft journal portions in the left and right socket journal portions respectively and so as to thereafter allow rotation of the pivot shaft in the socket to a second, operative angular position where the link may extend between the bell crank second arm portion and the latch and where the flatted sections are misaligned with the slots to preclude withdrawal of the pivot shaft from the socket; and the first arm portion of the bell crank operative with the door module plate assembly positioned in the module opening to be engaged by the outside door handle in response to inward movement of the outside door handle to rotate the bell crank in the socket and trip the door latch.

3. A door module assembly according to claim 2 wherein the module plate assembly comprises a module plate and a presenter plate mounted on the module plate, the presenter plate defining the socket.

4. A method of fabricating a motor vehicle door module assembly and integrating same with a motor vehicle door structure having spaced inner and outer panels, an outside door handle positioned on the outer panel, a module opening in the inner panel, and a latch opening for receipt of a door latch for coaction with the striker on the vehicle door iamb to latch and unlatch the door further wherein the module assembly includes a module plate assembly, a door latch, and an actuator defining a pivot shaft axis and having an outboard face positioned to be engaged by the outside door handle and connected to a link arranged to trip the latch in response to pivotal movement of the actuator, the method comprising the steps of:

fabricating the module assembly including the sub step of forming a socket integral with the module plate assembly in such a way as to define a socket pivot axis;

securing the latch to the module plate assembly;

insetting the actuator into the socket with the actuator in a first angular position relative to the socket and in response to movement of the pivot shaft axis from a ready position laterally displaced from and substantially parallel to the socket pivot axis to an inserted position in which the pivot shaft axis coincides with the socket pivot axis;

rotating the actuator to a second angular position relative to the socket in which withdrawal of the actuator from the socket is precluded;

attaching the link to the actuator and to the latch with the actuator in the second angular position; and assembling the door module assembly to the door structure with the module plate assembly positioned in the module opening, the latch positioned in the latch opening for coaction with the striker, and the outboard face of the actuator positioned in the path of inward movement of the outside door handle whereby inward movement of the outside door handle rotates the actuator to trip the latch and open the door.

5. A method according to claim 4 wherein:

the actuator is a bell crank having a first arm defining the outboard face and positioned to be engaged by the outside door handle and a second arm portion connected to the link;

the bell crank is pivotally mounted on the module plate assembly with the bell crank in the first angular position;

the bell crank is thereafter pivoted to the second angular position; and the link is attached to the second arm portion of the bell crank with the bell crank in the second angular position.

6. A method according to claim 5 wherein:

the pivotal movement of the bell crank on the module plate assembly is achieved by a pivot shaft portion of the bell crank defining the pivot shaft axis; and the pivot shaft portion is configured to be inserted into the socket with the bell crank oriented in the first angular position whereafter the bell, crank is rotated to rotate the pivot shaft portion to the second angular position for attachment of the link.

7. A method according to claim 4 wherein the module plate assembly comprises a module plate and a presenter plate mounted on the module plate and defining the socket.

8. A motor vehicle door module assembly including a door module plate assembly mounting a bell crank having a first arm portion positioned to be engaged by an outside door handle and a second arm portion connected to a link arranged to trip the door latch, characterized in that:

the door module assembly is integrally formed with a socket pivotally receiving the bell crank;

the bell crank includes a pivot shaft portion sized to be journalled in the socket;

the pivot shaft portion is configured to be inserted into the socket in a first angular position;

following insertion the bell crank is rotated to rotate the pivot shaft portion in the socket to a second, operative angular position where the link may extend between the bell crank second arm portion and the latch and withdrawal of the shaft portion is precluded;

the shaft portion includes a lateral extension; and the door module assembly includes a coil spring positioned around the extension and coacting with the shaft portion and the module plate assembly to resiliently resist pivotal movement of the bell crank.

9. A motor vehicle door module assembly including a door module plate assembly mounting a bell crank having a first arm portion positioned to be engaged by an outside door handle and a second arm portion connected to a link arranged to trip the door latch, characterized in that:

the door module assembly is integrally formed with a socket pivotally receiving the bell crank;

the bell crank includes a pivot shaft portion sized to be journalled in the socket;

the pivot shaft portion is configured to be inserted into the socket in a first angular position;

following insertion the bell crank is rotated to rotate the pivot shaft portion in the socket to a second, operative angular position where the link may extend between the bell crank second arm portion and the latch and withdrawal of the shaft portion is precluded;

the pivot shaft portion has a circular cross-sectional configuration;

the socket has a circular cross-sectional configuration sized to pivotally mount the shaft portion;

the pivot shaft portion configuration allowing insertion into the socket comprises opposite flats on the shaft portion defining reduced diameter shaft portion sections; and the modular plate assembly defines slots providing access to the socket and sized to pass the reduced diameter shaft portion sections to allow positioning of the pivot shaft portion in the socket.

10. A method of fabricating a motor vehicle door module assembly including a module plate assembly, a door latch, and an actuator positioned to be engaged by an outside door handle and connected to a link arranged to trip the latch in response to movement of the actuator, the method comprising:

fabricating the module plate assembly;

securing the latch to the module plate assembly;

mounting the actuator on the module plate assembly with the actuator in a first angular position;

moving the actuator to a second angular position; and attaching the link to the actuator and to the latch with the actuator in the second angular position;

the actuator comprising a bell crank having a first arm positioned to be engaged by the outside door handle and a second arm portion connected to the link;

the bell crank being pivotally mounted on the module plate assembly with the bell crank in the first angular position;

the bell crank being thereafter pivoted to the second angular position;

the link being attached to the second arm portion of the bell crank with the bell crank in the second angular position;

the pivotal movement of the bell crank on the module plate assembly being achieved by a pivot shaft portion of the bell crank journalled in a socket defined on the module plate assembly;

the pivot shaft portion being configured to be inserted into the socket with the bell crank oriented in the first angular position whereafter the bell crank is rotated to rotate the pivot shaft portion to the second angular position for attachment of the link;

the pivot shaft portion having a circular cross-sectional configuration;

the socket having a circular cross-sectional configuration sized to pivotally mount the pivot shaft portion;

the pivot shaft portion configuration allowing insertion into the socket comprising opposite flats on the pivot shaft portion defining reduced diameter shaft portion sections;

the module plate assembly defining slots providing access to the socket and sized to pass the reduced diameter shaft portion sections to allow positioning of the pivot shaft portion in the socket.

* * * * *